United States Patent [19]

Speca et al.

[11] Patent Number: 5,786,291
[45] Date of Patent: Jul. 28, 1998

[54] ENGINEERED CATALYST SYSTEMS AND METHODS FOR THEIR PRODUCTION AND USE

[75] Inventors: Anthony N. Speca, Kingwood; Jeffrey L. Brinen, League City; James J. McAlpin, Houston, all of Tex.

[73] Assignee: Exxon Chemical Patents, Inc., Houston, Tex.

[21] Appl. No.: 800,743

[22] Filed: Feb. 18, 1997

Related U.S. Application Data

[60] Provisional application No. 60/012,185, Feb. 23, 1996 and provisional application No. 60/032,710, Dec. 13, 1996.

[51] Int. Cl.$^6$ .............. B01J 31/00; B01J 37/00; C08F 4/02; C08F 4/60

[52] U.S. Cl. .......... 502/104; 502/103; 502/108; 502/113; 502/117; 502/151; 502/152; 502/153; 502/154; 526/160; 526/993

[58] Field of Search .............. 502/103, 104, 502/108, 113, 117, 151, 152, 153, 154

[56] References Cited

U.S. PATENT DOCUMENTS

| | | | |
|---|---|---|---|
| 4,975,403 | 12/1990 | Ewen | 502/113 |
| 5,064,797 | 11/1991 | Stricklen | 502/152 |
| 5,182,244 | 1/1993 | Pettijohn | 502/104 |
| 5,252,529 | 10/1993 | Ueda et al. | 502/113 |
| 5,278,264 | 1/1994 | Spaleck et al. | 502/117 |
| 5,332,706 | 7/1994 | Nowlin et al. | 502/107 |
| 5,696,045 | 12/1997 | Winter et al. | 502/152 |

FOREIGN PATENT DOCUMENTS

| | | |
|---|---|---|
| 2133181 | 9/1994 | Canada . |
| 0 277 003 | 8/1988 | European Pat. Off. . |
| 0 277 004 | 8/1988 | European Pat. Off. . |
| 0 279 586 | 8/1988 | European Pat. Off. . |
| 0 426 637 | 5/1991 | European Pat. Off. . |
| 0 495 375 | 7/1992 | European Pat. Off. . |
| 0 500 944 | 9/1992 | European Pat. Off. . |
| 0 520 732 | 12/1992 | European Pat. Off. . |
| 516458A2 | 12/1992 | European Pat. Off. . |
| 0 549 900 | 7/1993 | European Pat. Off. . |
| 0 561 476 | 9/1993 | European Pat. Off. . |
| 0 570 982 | 11/1993 | European Pat. Off. . |
| 0 573 403 | 12/1993 | European Pat. Off. . |
| 0 576 970 | 1/1994 | European Pat. Off. . |
| 0 594 218 | 4/1994 | European Pat. Off. . |
| 310734B1 | 11/1994 | European Pat. Off. . |
| 91/09882 | 7/1991 | WIPO . |
| 92/00333 | 1/1992 | WIPO . |
| 94/03506 | 2/1994 | WIPO . |
| 94/10180 | 5/1994 | WIPO . |
| 95/12622 | 5/1995 | WIPO . |

*Primary Examiner*—Mark L. Bell
*Assistant Examiner*—J. Pasterczyk
*Attorney, Agent, or Firm*—Paige Schmidt

[57] ABSTRACT

This invention relates to supported metallocene catalyst systems and to methods for their production and use. Specifically, this invention relates to supported catalyst systems having unique, predetermined properties resulting from the designed distribution of catalyst components within and upon porous support particles. The designed distribution of catalyst components is obtained through sequential deposition of catalyst components with intervening removal of solvent.

25 Claims, No Drawings

ENGINEERED CATALYST SYSTEMS AND METHODS FOR THEIR PRODUCTION AND USE

The application is based on Provisional Application Ser. No. 60/012,185, filed Feb. 23, 1996, and Provisional Application Ser. No. 60/032,710, filed Dec. 13, 1996.

FIELD OF THE INVENTION

This invention relates generally to supported metallocene catalyst systems and to methods for their production and use. Specifically, this invention relates to supported metallocene catalyst systems having unique, predetermined properties resulting from the designed distribution of catalyst components within and/or upon the support particles.

BACKGROUND

The new generation of metallocene catalyzed polymers is expected to have profound effects on the polyolefin industry. Polyolefin resins produced by metallocene catalyst in general have a number of improved properties as compared to conventional polymers produced with Ziegler-Natta catalysts. As more and more product manufacturers begin utilizing metallocene produced polymers, various areas for polymer improvement will become apparent. Currently, polymer producers may choose from a variety of techniques to manipulate the polymer such as post reactor polymer degradation, blending, change of catalyst, use of additives and varying the polymerization conditions.

Metallocene catalyzed propylene polymers are among the newest metallocene produced polymers now commercially available. One major product area for these new polymers is in spunbond and melt blown nonwoven fabrics. The metallocene produced propylene polymers have a number of advantages over conventional polymers. For example, these polymers have a narrow molecular weight distribution which enable significantly higher spinning speeds and finer denier fibers. In addition, due to their unique molecular architecture, these polymers have an extractable level that is less than one third that of conventional polymers.

It has been found, however, that when certain metallocene produced propylene polymers are used to make spunbond fabrics at very high line speed, the bonding of the fibers into the finished web can be deficient. This deficiency is believed to be due at least in part to the fact that the polymer has a very narrow tacticity distribution as compared to conventionally produced propylene polymer. The narrow tacticity distribution of the polymer causes the fabric to have a very narrow bonding window, i.e., range of temperatures over which the fibers will bond. This narrow bonding window in conjunction with high line speed results in fabrics that are inadequately bonded.

In order to address this bonding problem, the present inventors sought to manipulate the polymer tacticity distribution. It was hypothesized that broadening the tacticity distribution of the propylene polymer would result in a broadened bonding window. The present inventors have found that the tacticity distribution of isotactic polypropylene can be broadened by making the polymer with at least two different metallocenes, provided that two or more metallocenes are chosen that produce polymer having different tacticities.

It is known in the art to use two metallocenes to make polymer having broadened molecular weight distribution. EP 0 310 734, for example discloses the use of at least two different metallocene catalysts which are chiral and stereorigid in combination with an aluminum compound to produce polymer having a broad molecular weight distribution. Although these catalysts are described as being useful for the production of polypropylene, the disclosure is limited to nonsupported catalyst systems.

EP 645 401 also describes the use of at least two stereorigid metallocenes, of which at least one has substituted indenyl ligands. These catalysts produce high molecular weight isotactic polypropylene having a broad molecular weight distribution.

WO 94/28034 describes supported metallocene catalyst systems containing one metallocene. These metallocenes have high activity and are capable of producing high molecular weight isotactic polypropylene without fouling the reactor. The catalyst system is prepared by premixing the metallocene and alumoxane activator then combining the reaction product with support material.

Thus the prior art teaches that high molecular weight, isotactic polypropylene may be produced with supported metallocene catalyst systems. The prior art further teaches the preparation of high molecular weight istotactic polypropylene having a broad molecular weight distribution using two or more stereorigid metallocenes, of which at least one has substituted indenyl ligands. To our knowledge, however, nothing in the prior art addresses the problems associated with narrow tacticity distribution.

The present inventors have found that the tacticity distribution of isotactic polypropylene may be broadened by selecting two or more metallocenes where the first metallocene is capable of producing isotactic polypropylene ("metallocene A") and the second metallocene, which is stereorigid and has substituted indenyl ligands, is capable of producing highly isotactic polypropylene ("metallocene B"). These catalyst systems have high activity and produce isotactic polymer that not only has a broadened tacticity distribution but has high weight average molecular weight, good melt flow rate and low extractables.

Additionally, the present inventors have discovered that supported metallocene catalyst systems having selected attributes may be prepared by manipulating the placement of the metallocene catalyst system components on and within the support material. For example, the present inventors have found that reactor fouling is reduced or eliminated and the polymer product morphology significantly improved when two or more metallocenes are layered on and in the support material particles. This layering is accomplished by combining the support with a solution of metallocene A, drying the support, then combining the dried supported metallocene A with a solution of metallocene B.

SUMMARY

This invention relates generally to a method for preparing a supported metallocene catalyst, said method comprising the steps of: (a) combining support material and a first solution comprising a first metallocene; then (b) drying the mixture thereby forming supported first metallocene; then (c) combining the supported first metallocene with a second solution comprising a second metallocene wherein the second metallocene is different from the first; then (d) drying the resulting mixture.

More specifically, this invention relates to a method for preparing a supported metallocene catalyst, said method comprising the steps of: (a) combining porous support material and a first solution comprising solvent and a first metallocene wherein the volume of the first solution is less than about three times the total pore volume of the porous support; then (b) drying the thereby formed supported first metallocene; then (c) combining the supported first metallocene with a second solution comprising solvent and a second metallocene wherein the second metallocene is different from the first and wherein the volume of solution is less than about three times the total pore volume of the supported first metallocene; then (d) drying the resulting mixture.

Even more specifically, this invention relates to a method for preparing a supported metallocene catalyst system, said method comprising the steps of: (a) combining porous support material having active hydroxyl groups and a first solution consisting essentially of solvent and a first metallocene wherein the volume of the first solution is less than about 3.0 times the total pore volume of the porous support; then (b) drying the mixture until residual solvent is removed thereby forming supported first metallocene; then (b) combining the supported first metallocene with a second solution comprising solvent, a second metallocene, and alumoxane wherein the second metallocene is different from the first and wherein the volume of solution is less than about 3.0 times the total pore volume of the supported first metallocene; then (c) drying the resulting mixture. Additionally this invention relates to catalyst systems prepared by the above methods and to polymerization processes involving the use of these catalyst systems.

DETAILED DESCRIPTION
Catalyst System Components
Metallocenes

Generally three components make up the catalyst systems of this invention; two or more metallocenes, activator and support material. As used herein "metallocene" refers generally to compounds represented by the formula $Cp_mMR_nX_q$ wherein $C_p$ is a cyclopentadienyl ring which may be substituted or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods of making and using metallocenes are very well known in the art. For example, metallocenes are discussed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790 each fully incorporated herein by reference.

For the preparation of isotactic polypropylene the preferred metallocenes are those represented by the formula L:

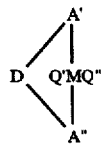

in which M' is a Group 4, 5, or 6 transition metal, preferably zirconium; Q' and X" are the same or different hydride, halogen, preferably Cl, hydrocarbyl or alkyl radical having up to about 6 carbon atoms; A' and A" are the same or different asymmetrical hydrocarbyl, preferably a substituted cyclopentadienyl group, even more preferably an indenyl group or substituted indenyl group; and D is a linear or cyclic hydrocarbon radical bridge of from one to six atoms. Preferably the bridge contains a silicon atom that is disubstituted with alkyl groups. Specific examples of these chiral, bridged metallocenes include but are not limited to racemic: dimethylsilanediylbis(3-methylcyclopentadienyl) $ZrCl_2$; dimethylsilanediylbis(indenyl) $ZrCl_2$; dimethylsilanediylbis(4,5,6,7-tetrahydroindenyl) $ZrCl_2$; [1,1'-(1,1,2,2-tetramethylsilanediyl)bis(3-methylcyclopentadienyl)] $ZrCl_2$; [1,1'-(1,1,2,2-tetramethylsilanediyl)bis(4,5,6,7-tetrahydroindenyl) $ZrCl_2$;

Methods for preparing and using these types of metallocenes are well known. These metallocenes are discussed extensively in U.S. Pat. Nos. 4,769,510; 4,933,403; 5,120,867; and 5,314,973; each fully incorporated herein by reference.

For the preparation of highly isotactic, high molecular weight polypropylene, preferred metallocenes are those represented by the following formula II.:

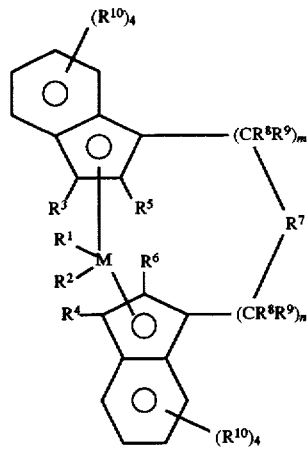

wherein M is a metal of Group 4, 5, or 6 of the Periodic Table preferably, zirconium, hafnium and titanium, most preferably zirconium;

$R^1$ and $R^2$ are identical or different, are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$-arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

R⁷ is

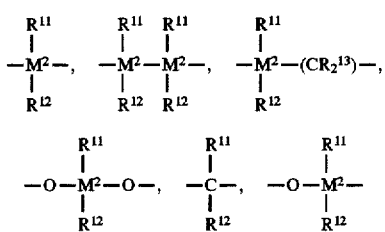

—B(R¹¹)—, ⁻Al(R¹¹)—, —Ge—, —Sn—, —O—, —S—, —SO—, —SO₂—, —N(R¹¹)—, —CO—, —P(R¹¹)—, or —P(O)(R¹¹)—; wherein:

$R^{11}$, $R^{12}$ and $R^{13}$ are identical or different and are a hydrogen atom, a halogen atom, a $C_1-C_{20}$ alkyl group, preferably a $C_1-C_{10}$ alkyl group, a $C_1-C_{20}$ fluoroalkyl group, preferably a $C_1-C_{10}$ fluoroalkyl group, a $C_6-C_{30}$ aryl group, preferably a $C_6-C_{20}$ aryl group, a $C_6-C_{30}$ fluoroaryl group, preferably a $C_6-C_{20}$ fluoroaryl group, a $C_1-C_{20}$ alkoxy group, preferably a $C_1-C_{10}$ alkoxy group, a $C_2-C_{20}$ alkenyl group, preferably a $C_2-C_{10}$ alkenyl group, a $C_7-C_{40}$ arylalkyl group, preferably a $C_7-C_{20}$ arylalkyl group, a $C_8-C_{40}$ arylalkenyl group, preferably a $C_8-C_{22}$ arylalkenyl group, a $C_7-C_{40}$ alkylaryl group, preferably a $C_7-C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) is fluorine, chlorine, bromine or iodine atoms, preferably fluorine or chlorine.

Particularly preferred metallocenes are compounds of the structures:

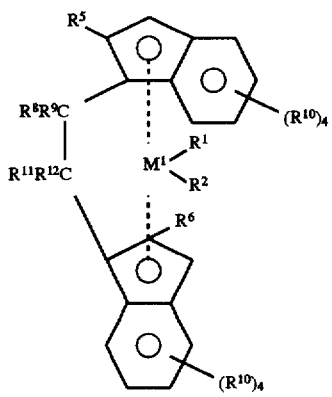

(A)

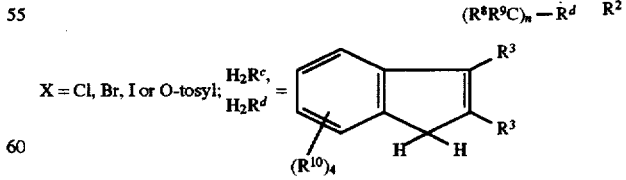

(B)

wherein:

$M^1$ is Zr or Hf, $R^1$ and $R^2$ are methyl or chlorine, and $R^5$, $R^6$, $R^8$, $R^9$, $R^{10}$, $R^{11}$ and $R^{12}$ have the above-mentioned meanings.

These chiral metallocenes may be used as a racemate for the preparation of highly isotactic polypropylene copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

Generally, the metallocenes are prepared by a multi-step process involving repeated deprotonations/metallations of the aromatic ligands and introduction of the bridge and the central atom by their halogen derivatives. The following reaction scheme illustrates this generic approach:

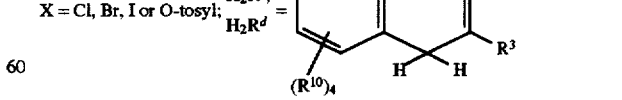

Additional methods for preparing metallocenes are fully described in the *Journal of Organometallic Chem.*, volume 288, (1985), pages 63–67, and in EP-A-320762, for preparation of the metallocenes described, both of which are herein fully incorporated by reference.

Illustrative but non-limiting examples of these metallocenes include:

Dimethylsilandiylbis (2-methyl-4-phenyl-1-indenyl)ZrCl$_2$
Dimethylsilandiylbis(2-methyl-4,5-benzoindenyl)ZrCl$_2$;
Dimethylsilandiylbis(2-methyl-4,6-diisopropylindenyl)ZrCl$_2$;
Dimethylsilandiylbis(2-ethyl-4-phenyl-1-indenyl)ZrCl$_2$;
Dimethylsilandiylbis (2-ethyl-4-naphthyl-1-indenyl)ZrCl$_2$.
Phenyl(Methyl)silandiylbis(2-methyl-4-phenyl-1-indenyl)ZrCl$_2$.
Dimethylsilandiylbis(2-methyl-4-(1-naphthyl)-1-indenyl)ZrCl$_2$.
Dimethylsilandiylbis(2-methyl-4-(2-naphthyl)-1-indenyl)ZrCl$_2$.
Dimethylsilandiylbis(2-methyl-indenyl)ZrCl$_2$.
Dimethylsilandiylbis(2-methyl-4,5-diisopropyl-1-indenyl)ZrCl$_2$.
Dimethylsilandiylbis(2,4,6-trimethyl-1-indenyl)ZrCl$_2$.
Phenyl(Methyl)silandiylbis(2-methyl4,6-diisopropyl-1-indenyl)ZrCl$_2$.
1,2-Ethandiylbis(2-methyl-4,6-diisopropyl-1-indenyl)ZrCl$_2$.
1,2-Butandiylbis(2-methyl-4,6-diisopropyl-1-indenyl)ZrCl$_2$.
Dimethylsilandiylbis(2-methyl-4-ethyl-1-indenyl)ZrCl$_2$.
Dimethylsilandiylbis(2-methyl-4-isopropyl-1-indenyl)ZrCl$_2$.
Dimethylsilandiylbis(2-methyl-4-t-butyl-1-indenyl)ZrCl$_2$.
Phenyl(Methyl)silandiylbis(2-methyl-4-isopropyl-1-indenyl)ZrCl$_2$.
Dimethylsilandiylbis(2-ethyl-4-methyl-1-indenyl)ZrCl$_2$.
Dimethylsilandiylbis(2,4-dimethyl-1-indenyl)ZrCl$_2$.
Dimethylsilandiylbis(2-methyl-4-ethyl-1-indenyl)ZrCl$_2$.
Dimethylsilandiylbis(2-methyl-α-acenaphth-1-indenyl)ZrCl$_2$.
Phenyl(Methyl)silandiylbis(2-methyl-4,5-benzo-1-indenyl)ZrCl$_2$.
Phenyl(Methyl)silandiylbis(2-methyl-4,5-(methylbenzo)-1-indenyl)ZrCl$_2$.
Phenyl(Methyl)silandiylbis(2-methyl-4,5-(tetramethylbenzo)-1-indenyl)ZrCl$_2$.
Phenyl(Methyl)silandiylbis (2-methyl-a-acenaphth-1-indenyl)ZrCl$_2$.
1,2-Ethandiylbis(2-methyl-4,5-benzo-1-indenyl)ZrCl$_2$.
1,2-Butandiylbis(2-methyl-4,5-benzo-1-indenyl)ZrCl$_2$.
Dimethylsilandiylbis(2-methyl-4,5-benzo-1-indenyl)ZrCl$_2$.
1,2-Ethandiylbis(2,4,7-trimethyl-1-indenyl)ZrCl$_2$.
Dimethylsilandiylbis(2-methyl-1-indenyl)ZrCl$_2$.
1,2-Ethandiylbis(2-methyl-1-indenyl)ZrCl$_2$.
Phenyl(Methyl)silandiylbis(2-methyl-1-indenyl)ZrCl$_2$.
Diphenylsilandiylbis(2-methyl-1-indenyl)ZrCl$_2$.
1,2-Butandiylbis(2-methyl-1-indenyl)ZrCl$_2$.
Dimethylsilandiylbis(2-ethyl-1-indenyl)ZrCl$_2$.
Dimethylsilandiylbis(2-methyl-5-isobutyl-1-indenyl)ZrCl$_2$.
Phenyl(Methyl)silandiylbis(2-methyl-5-isobutyl-1-indenyl)ZrCl$_2$.
Dimethylsilandiylbis(2-methyl-5-t-butyl-1-indenyl)ZrCl$_2$.
Dimethylsilandiylbis(2,5,6-trimethyl-1-indenyl)ZrCl$_2$, and the like.

These preferred metallocene catalyst components are described in detail in U.S. Pat. Nos. 5,145,819; 5,243,001; 5,239,022; 5,329,033; 5,296,434; 5,276,208; and 5,374,752; and EP 549 900 and 576 970 all of which are herein fully incorporated by reference.

Activators

Metallocenes are generally used in combination with some form of activator in order to create an active catalyst system. The term "activator" is defined herein to be any compound or component capable of enhancing the ability of one or more metallocenes to polymerize olefins to polyolefins. Alklyalumoxanes are preferably used as activators, most preferably methylalumoxane (MAO). Generally alkylalumoxanes contain about 5 to 40 of the repeating units:

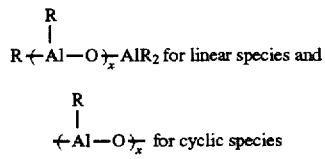

$R{+}Al-O{\}_x\!\!-AlR_2$ for linear species and ${+}Al-O{\}_x\!\!-$ for cyclic species where R is a $C_1$-$C_8$ alkyl including mixed alkyls. Particularly preferred are the compounds in which R is methyl. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952, 540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594 218 and WO 94/10180, each fully incorporated herein by reference.

Some MAO solutions tend to become cloudy and gelatinous over time. It may be advantageous to clarify such solutions prior to use. A number of methods are used to create gel-free MAO solutions or to remove gels from the solutions. Gelled solutions are often simply filtered or decanted to separate the gels from the clear MAO. U.S. Pat. No. 5,157,137 discloses a process for forming clear, gel-free solutions of alkylalumoxane by treating a solution of alkylalumoxane with an anhydrous salt and/or hydride of an alkali or alkaline earth metal.

It is also within the scope of this invention to use ionizing activators, neutral or ionic, or compounds such as tri(n-butyl)ammonium tetrakis(pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators are also contemplated by the invention, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing both the active metallocene cation and an noncoordinating anion is also known. See, EP-A-0 426 637 and EP-A-0 573 403 (incorporated herein by reference). An additional method of making the ionic catalysts uses ionizing anion pre-cursors which are initially neutral Lewis acids but form the cation and anion upon ionizing reaction with the metallocene compounds, for example the use of tris(pentafluorophenyl) boron. See EP-A-0 520 732 (incorporated herein by reference). Ionic catalysts for addition polymerization can also be prepared by oxidation of the metal centers of transition metal compounds by anion pre-cursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Methods of supporting ionic catalysts comprising metallocene cations and noncoordinating anions are described in WO91/09882, WO 94/03506 and in co-pending U.S. Ser. No. 08/248,284, filed Aug. 3, 1994 (incorporated herein by reference). The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

Support Materials

The catalyst systems of this invention are fixed on a support material. Likewise, the method of this invention involves depositing metallocenes (with or without activator) on support material. For purposes of this patent specification the term "support" is defined as any material upon which metallocenes and/or activators may be fixed. Preferably, the support material is a porous particulate material, such as talc, inorganic oxides, inorganic chlorides and resinous materials such as polyolefin or polymeric compounds. Such materials are generally commercially available.

The preferred support materials are porous inorganic oxide materials, which include those from the Periodic Table of Elements of Groups 2, 3, 4, 5, 13 or 14 metal oxides. Silica, alumina, silica-alumina, and mixtures thereof are most preferred. Other inorganic oxides that may be employed either alone or in combination with the silica, alumina or silica-alumina, are magnesia, titania, zirconia, and the like.

Preferably the support material is porous silica which has a surface area in the range of from about 10 to about 700 $m^2/g$, a total pore volume in the range of from about 0.1 to about 4.0 cc/g and an average particle size in the range of from about 10 to about 500 µm. More preferably, the surface area is in the range of from about 50 to about 500 $m^2/g$, the pore volume is in the range of from about 0.5 to about 3.5 cc/g and the average particle size is in the range of from about 20 to about 200 µm. Most preferably the surface area is in the range of from about 100 to about 400 $m^2/g$, the pore volume is in the range of from about 0.8 to about 3.0 cc/g and the average particle size is in the range of from about 30 to about 100 µm. The average pore size of typical porous support materials is in the range of from about 10 to about 1000 Å. Preferably, a support material is used that has an average pore size of from about 50 to about 500 Å, and most preferably from about 75 to about 350 Å.

Methods of Making the Catalysts

We have found that catalyst components can be selectively positioned on support material particles in order to alter the catalytic behavior of the catalyst system thereby polymerizing olefins in a predetermined manner. In very general terms, this method involves the fixing of a catalyst component such as a metallocene on a particular portion of a support material particle.

The fixing of the catalyst component(s) may be either chemical or physical. Silica, for example, commonly has hydroxyl groups on its surface. These hydroxyl groups, however, can react with metallocenes and/or activators thereby immobilizing or fixing the molecules. An excess of hydroxyl groups may also deactivate these components. Heat or chemical treatment may be used to dehydrate the silica or otherwise remove or neutralize hydroxyl groups. Generally the use of temperatures of from about 100° C. to about 1000° C. for about 1 to about 24 hours substantially reduces surface hydroxyl groups. Preferably a temperature of from about 300° C. to about 800° C. is used for up to 24 hours or until about a 3% or less, more preferably a 1% or less, loss on ignition value is obtained. Chemicals such as chlorosilanes, may also be used to dehydrate silica. The loss on ignition value is determined by exposing an amount of the dried support material to 1000° C. for 20 hours and dividing the weight lost by the weight of the support before this treatment and multiplying by 100.

If a non-porous support material is used, the catalyst component(s) can be layered on the surface of the support particle by first exposing the support material to one component then exposing the support material to another component. If the fixation is physical in nature, then it will likely be necessary to dry the support material between component applications. If the fixation is chemical in nature, then drying may be unnecessary. For example, the metallocene/activator product may react with the hydroxyl groups on the silica surface and become thereby chemically fixed on and/or in the silica.

When porous support materials are used, the volume of catalyst component solution may become critical, particularly when the catalyst component is fixed on and/or in the support physically as opposed to chemically. For example, in order to concentrate metallocene on the interior of the support particles and activator on the exterior of support particles, the following method may be employed. Porous, dehydrated silica is mixed with a volume of metallocene dissolved in toluene. The volume of metallocene is less than 1.5 times the total pore volume of the silica so that the silica either appears dry or slightly damp. In this way, most, if not all, of the metallocene solution is pulled into the pores of the silica via capillary forces. Since capillary forces increase with decreasing pore radius, the narrowest pores are filled first. Next, the silica is dried thoroughly using heat and/or vacuum to remove most or all of the toluene from the pores of the silica.

Finally, a MAO solution is applied to the silica. Again, it is preferable to expose the silica to as little solvent as possible in order to avoid causing the metallocene to migrate out of the silica pores. Again, the silica should be dried to remove the MAO solvent. The MAO also fills the pores from smallest to largest so that the resulting supported catalyst system has a distribution of active sites due to the distribution of activator and metallocene ratios.

There are many possible variations on the theme described above. For example, the silica or other support material may first be exposed to a first metallocene, dried, then exposed to a second, different metallocene. Alternatively, the support material may be exposed to a first metallocene, dried, exposed to a second, different metallocene, then dried an exposed to a third or first metallocene again. Each of these exposures may include more than one metallocene. For instance, the support material may be exposed to a first metallocene, dried, then exposed to a mixture of the first and a second, different metallocene. In each of the above cases the support material may be pre-treated with activator, treated with activator between treatments with metallocene and/or treated with activator after treatment with metallocene. The activator may be mixed with the first metallocene, the second metallocene, or both the first and second metallocenes. As used herein one metallocene is "different" from another if its chemical formula is not exactly the same.

The first and second metallocenes may not even be "different" as defined above but be in solution at differing concentrations so that a gradient of metallocene and/or activator concentration is created on and/or in the support particle. For example, the first metallocene applied to the support is highly concentrated or activated, the support is dried, and the second metallocene application consists of the same metallocene compound as the first but in a less concentrated solution such that the final catalyst particle has a higher concentration of active sites on the interior of the support particle as compared to the exterior of the support particle. Such a catalyst system might be expected to become more active as polymerization proceeds.

In another embodiment, porous support material is treated with a solution that is not a solvent for the metallocene and/or activator. The amount of solution is less than the total pore volume of the support. After this treatment, the support is not dried but is treated with a first metallocene and/or activator optionally followed by treatment with a second metallocene and/or activator. The effect of the first treatment with the solution that is not a solvent for the metallocene and/or activator is to force the metallocene and/or activator to deposit in the larger pores and/or closer to the surface of the support particle. The effect of this treatment would be to create polyolefin particles that are hollow to some extent.

In the context of preparing isotactic polypropylene, we have found that polypropylene having a broad tacticity distribution may be prepared by using two or more metallocenes that when used alone produce isotactic polypropylene having differing isotacticities. If the two metallocenes are mixed together with MAO and their reaction product applied to silica support, the polymer product may be sticky due to the presence of less isotactic polypropylene on the surface of the resulting polymer particle. These sticky particles agglomerate and form unmanageable chunks.

We have discovered that this problem is alleviated by placing the metallocene which produces the less isotactic polypropylene ("metallocene A") on the interior of the silica particle and layering the metallocene which produces highly isotactic polypropylene ("metallocene B") over metallocene A. This causes the less isotactic, sticky polypropylene to primarily form in the interior of the polymer particle. The exterior of the particle is less sticky and the particles remain separated. This is the first example of "engineering" a supported catalyst in order to effect a polymer modification. Alternatively, two or more metallocene Bs may be selected, particularly those which produce polymer having similar melt flow rate but different melting points.

The selection of metallocenes is based on many factors. To make polypropylene suitable for use in nonwoven fabric applications, the metallocenes should have high activity, be non-fouling, produce isotactic or highly isotactic polypropylene having high molecular weight and low extractables, a melt flow rate in the range of from about 5 to about 30 dg/min, preferably from about 10 to about 20 dg/min. The molecular weight distribution may be broad or narrow depending upon the particular properties desired.

As used herein "isotactic polypropylene" means having at least 30% istotactic pentads according to analysis by $^{13}$C-NMR or copolymers of propylene and one or more comonomers of ethylene, aliphatic or alicyclic $C_4$–$C_{20}$ alpha-olefin, or $C_4$–$C_{40}$ 1,n-dienes, wherein the comonomers are present in up to 40 mole %. As used herein "highly isotactic polypropylene" means having at least 50% istotactic pentads according to analysis by $^{13}$C-NMR or copolymers of propylene and one or more comonomers of ethylene, aliphatic or alicyclic $C_4$–$C_{20}$ alpha-olefin, or $C_4$–$C_{40}$ 1,n-dienes, wherein the comonomers are present in up to 40 mole %. In general, metallocenes represented by formula I above will produce isotactic polypropylene having suitable molecular weight.

In general, metallocenes represented by the formula II above, particularly formulas A and B, will produce highly isotactic polypropylene having high molecular weight. Of these metallocenes, ("metallocene B"), the following are particularly preferred for making highly isotactic polypropylene: rac-dimethylsilanediylbis(2,4-dimethylindenyl) $ZrCl_2$, rac-dimethylsilanediylbis(2,4-dimethyl-4-phenylindenyl)$ZrCl_2$, rac- dimethylsilanediylbis(2-methylindenyl)$ZrCl_2$, rac-dimethylsilanediylbis(2-methyl-4,5-benzoindenyl)$ZrCl_2$, and rac-dimethylsilanediylbis(2-methyl-4,6-diisopropylindenyl)$ZrCl_2$.

The preferred method for preparing a supported metallocene catalyst suitable for polymerizing polypropylene having a broad tacticity distribution involves the following steps: (a) combining support material and a first solution comprising a first metallocene; then (b) drying the mixture thereby forming supported first metallocene; then (c) combining the supported first metallocene with a second solution comprising a second metallocene wherein the second metallocene is different from the first; then (d) drying the resulting mixture. The activator can be introduced at any point.

Any support material may be used, however, preferably the support material is porous, at least partially dehydrated silica. It may be particularly desirable to dehydrate the silica at a temperature of from about 100° C. to about 800° C. anywhere from about 1 hour to about 24 hours. Any metallocene (or combination of metallocenes and activator(s)) may be used, however, preferably the first solution is a solution of metallocene A or B and the second is a solution of metallocene B and an activator, preferably MAO. The selection of specific metallocenes and activators will depend on the ultimate polymer attributes and product performance desired. Generally B metallocenes produce higher molecular weight, higher tacticity polypropylene compared to A metallocenes. There is enough variation within the B metallocene group to provide many polymer and application attribute variations.

Preferably, the volumes of both the first and second solutions is less than about 4.0 times the total pore volume of the silica, more preferably less than about 3.0 times the total pore volume of the silica, even more preferably less than about 2.5 times the total pore volume of the silica, even more preferably less than about 2.0 times the total pore volume of the silica, and most preferably less than about 1.5 times the total pore volume of the silica.

The procedure for measuring the total pore volume of a porous support or catalyst system is well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, *Total porosity and Particle Density of Fluid Catalysts By Liquid Titration*, Vol. 28, No. 3, Analytical Chemistry 332–334 (March, 1956).

When the volume of solution combined with the silica is less than one times the total pore volume of the silica, the silica appears completely dry and free-flowing and is consequently easy to mix and transfer. When volumes above one times the total pore volume of the porous silica are used, the silica becomes progressively more difficult to mix and transfer as volume increases because it has the consistency of damp or wet mud. At greater volumes of solution a slurry is eventually formed such that one can observe separation of the solution and silica as the silica settles. At the slurry stage, the silica is easier to mix and handle. These factors should be considered when choosing solution volumes.

Regardless of the amount of solution used, it is preferable to combine the silica and solution such that the solution is evenly distributed among the silica particles. Thus it is preferable to add the solution to the silica slowly either as a spray or drop-wise while the silica is mixed.

Any compatible solvent may be used to form the metallocene solutions. Non-limiting examples of solvents are aliphatic, aromatic and saturated hydrocarbons, and cyclic hydrocarbons such as isopentane, heptane, toluene and the like. The more preferred solvents are the cyclic aliphatic and aromatic hydrocarbons such as toluene.

Preferably the first solution contains metallocene A or B and MAO, preferably A without MAO such that the concentration of A is from about 1.0 to about 0.001 mmol metallocene metal/g support material, more preferably in the range of from about 0.5 to about 0.005 mmol metallocene metal/g support material, and most preferably in the range of from about 0.1 to about 1.01 mmol metallocene/g support material.

Preferably the second solution contains metallocene B and MAO such that the ratio of Al to metallocene metal is in the range of from about 500:1 to 50:1, preferably from about 300:1 to about 100:1.

Preferably the ratio of metallocene A to metallocene B in the final catalyst system is from about 10:90 to about 70:30, even more preferably from about 20:80 to about 60:40, more preferably from about 30:70 to about 60:40, and most preferably from about 40:60 to about 50:50. Preferably the final mole ratio of the aluminum of the alumoxane component to the transition metal of the metallocene component(s) applied to the support is in the range of ratios between about 12:1 to about 800:1, preferably 20:1 to less than 500:1, and most preferably 50:1 to less than 400:1.

The above presumes that the metallocene activities are similar. If the metallocene activities are considerably different, then this difference should be taken into account when determining how much of each to use.

The silica is dried after application of the first solution and after application of the second solution. Preferably the silica is dried until residual solvent trapped in the pores of the carrier is removed. This results in a free-flowing supported catalyst. Preferably greater than about 90% of all the solvent is removed from the supported catalyst system upon drying, even more preferably about 100% of the solvent is removed from the pores of the support material. Heat and/or vacuum may be used to dry the catalyst. Typically vacuum in the range of from about 0 to about 0.7 atm and temperature in the range of from about 25° C. to about 100° C. is used for a time period ranging from about 4 to about 36 hours. It may be advantageous to dry the catalyst at ambient temperature without vacuum or with a flow of warm inert gas such as nitrogen to avoid problems associated with migration of catalyst components from their designated positions.

The catalyst systems of this invention may be used directly in polymerization or the catalyst system may be prepolymerized using methods well known in the art. For details regarding prepolymerization, see U.S. Pat. Nos. 4,923,833 and 4,921,825, EP 0 279 863 and EP 0 354 893 each of which is fully incorporated herein by reference. The catalyst systems of this invention may also be combined with one or more additives such as scavengers. Examples of suitable scavenging compounds include triethylaluminum (TEAL), trimethylaluminum (TMAL), tri-isobutylaluminum (TIBAL), tri-n-hexylaluminuim (TNHAL) and the like. The amount of scavenging agent used depends upon the type used as well as the process conditions. Generally, for a scavenging agent such as TEAL, 1–500 ppm may be used, preferably, 2–100 ppm, more preferably 5–25 ppm.

Polymerization Processes

The catalyst system of this invention may be used in the polymerization of any monomer and optionally comonomers in any process including gas, slurry or solution phase or high pressure autoclave processes. (As used herein, unless differentiated, "polymerization" includes copolymerization and "monomer" includes comonomer.) Preferably, a gas or slurry phase process is used, most preferably a bulk liquid propylene polymerization process is used.

In the preferred embodiment, this invention is directed toward the bulk liquid polymerization and copolymerization of propylene or ethylene, particularly propylene, in a slurry or gas phase polymerization process, particularly a slurry polymerization process. Another embodiment involves copolymerization reactions of propylene or ethylene, particularly propylene, with one or more of the alpha-olefin monomers having from 4 to 20 carbon atoms, preferably 4–12 carbon atoms, for example alpha-olefin comonomers of ethylene, butene-1, pentene-1,4-methylpentene-1, hexene-1, octene-1, decene-1, and cyclic olefins such as styrene, cyclopentene or norbornene. Other suitable monomers include polar vinyl, diolefins such as dienes, for example, 1,3-butadiene, 1,4-hexadiene, norbornadiene or vinylnorbornene, acetylene and aldehyde monomers.

In another embodiment ethylene or propylene is polymerized with at least two different comonomers to form a terpolymer and the like, the preferred comonomers are a combination of alpha-olefin monomers having 3 to 10 carbon atoms, more preferably 3 to 8 carbon atoms, and/or dienes having 4 to 10 carbon atoms.

Typically in a gas phase polymerization process a continuous cycle is employed where in one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. (See for example U.S. Pat. Nos. 4,543,399; 4,588,790; 5,028,670; 5,352,749; 5,405,922, and 5,436,304 all of which are fully incorporated herein by reference.)

A slurry polymerization process generally uses pressures in the range of about 1 to about 500 atmospheres or even greater and temperatures in the range of −60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be, for example, an alkane or a cycloalkane. The medium employed should be liquid under the conditions of polymerization and relatively inert. Non-limiting examples of liquid mediums include hexane and isobutane.

The polymers and copolymers made by the process of the invention are useful in forming operations such as, for example, film, sheet, and fiber extrusion and co-extrusion as well as blow molding, injection molding, sheet thermoforming and rotational molding. Films include blown or cast films in mono-layer or multilayer constructions formed by coextrusion or by lamination. Such films are useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fiber forming operations include melt spinning, solution spinning and melt blown fiber operations. Such fibers may be used in woven or nonwoven form to make filters, diaper fabrics, medical garments, geotextiles, etc. Extruded articles include, for example, medical tubing, wire and cable coatings, geomembranes, and pond liners. Molded articles include single and multi-layered constructions in the form of bottles, tanks, large hollow articles, rigid food containers and toys, etc.

The broad tacticity distribution isotactic polypropylenes prepared by the processes of this invention are suitable for nonwoven fabric applications preferably have a weight average molecular weight (MW) that is in the range of from about 50,000 to about 5,000,000, preferably 100,000 to about 1,000,000, more preferably from about 150,000 to about 900,000. These polymers preferably have a melt flow rate (MFR) that is in the range of from about 20 dg/min. to about 60 dg/min., preferably from about 25 dg/min. to about 55 dg/min., even more preferably from about 30 dg/min. to about 50 dg/min., and most preferably from about 30 dg/min. to about 45 dg/min. These polymers preferably have a composition distribution breadth index (CDBI) that is in the range of from about 25.0 to about 90.0, even more preferably from about 30.0 to about 85.0, even more preferably from about 35.0 to about 80.0, and most preferably from about 35.0 to about 75.0. The percent solubles of these polymers is less than about 20.0, preferably less than about 15, even more preferably less than about 10, and most preferably less than about 10. The melting point of these polymers is preferably in the range of from about 125.0° C. to about 200° C., preferably from about 130° C. to about 180° C., and most preferably from about 130° C. to about 175° C.

Nonwoven Fabrics

The broad tacticity distribution polymers described above are particularly useful for the production of spunbond and melt blown nonwoven fabrics. The spunbonding process is well known in the art. Generally it involves the extrusion of fibers through a spinneret. These fibers are then drawn using high velocity air and laid on an endless belt. A calandar roll is then used to heat the web and bond the fibers to one another. The melt blowing process is also well known in the art. For more information see WO 94/28219 published Dec. 8, 1994 herein fully incorporated by reference.

When nonwoven fabrics are prepared using the broad tacticity distribution polymer described above, the manufacturer can use increased line speed while making finer and stronger fibers with higher birefringence compared to fibers made using conventional polymers. The resulting fabrics are not only stronger but have lower oil and wax content, higher filtration efficiency, and are softer than fabrics made using conventional polymers. The broadened tacticity distribution allows the fibers to be heated and bonded to one another more efficiently and quickly than fibers made with polymer having a narrow tacticity distribution.

EXAMPLES

MFR is measured by the method of ASTM-1238 condition L. CDBI and percent solubles are determined by Temperature Rising Elution Fractionation (TREF) as described in Wild, et al., *J. Poly. Sci. Ed.*, Vol. 20, p. 441, (1982). Average Particle Size (APS) is the mean size of the polymer distribution as measured according to ASTM D 1921-87 (Method A).

Catalyst Preparations

Example 1

In an inert $N_2$ atmosphere 0.0517 g of dimethylsilanediylbis(4,5,6,7-tetrahydroindenyl)$ZrCl_2$ (metallocene A) was dissolved in 14.8 g toluene. Separately 8.01 g MS948 silica (Davison Chemical Division of W. R. Grace, Baltimore, Md.) (1.5–1.6 cc/g pore volume) previously dehydrated to 200° C. in a stream of flowing $N_2$ was added to a beaker. After stirring for 5 minutes, the metallocene solution was added all at once to the silica. The liquid wetted the silica to form a stiff but stirrable solid. The pore volume loading of the silica was 130%. After five minutes of stirring with a spatula, the solid was dried using a rotary evaporator. Over the next 2 hours, vacuum was increased from 25" to 29" of Hg while oil temperature was increased to 35° C. At the end 8.42 g of free flowing solid was obtained. All of the solid was transferred to a beaker. Separately, 36.01 g of 30 wt % methylalumoxane solution in toluene (Albemarle Corporation, Baton Rouge, La.) was added to 0.0686 g of dimethylsilanediylbis(2,2-dimethylindenyl)zirconium dichloride (metallocene B) followed by 9.78 g toluene to form the precursor. The metallocene dissolved immediately upon addition of the MAO. After stirring for 5 minutes the precursor was added all at once to the solid obtained above. The liquid precursor wetted the silica to form a stiff but stirrable solid. The pore volume loading of the silica was about 160%. After five minutes of stirring with a spatula, the solid was dried using a rotary evaporator. Over the next 4 hours, vacuum was increased from 25" to 29" inches of Hg while oil temperature was increased from 25° C. to 35° C. After drying, 11.5 g of free flowing solid was obtained. Analysis showed a loading of 8.94 wt % Al and 0.20 wt % Zr with an Al/Zr molar ratio of 152.

17

Comparative Example 2

In an inert $N_2$ atmosphere 3.5 g of 30 wt % methylalumoxane solution in toluene was added to 0.042 g dimethylsilanediylbis(4,5,6,7-tetrahydroindenyl)ZrCl$_2$ (metallocene A) followed by 4.0 g toluene to form the precursor. The metallocene dissolved immediately upon addition of the methylalumoxane. Separately, 4.0 g MS 948 silica previously dehydrated to 600° C. in a stream of flowing $N_2$ was added to a beaker. After stirring for 5 minutes the precursor was added all at once to the silica. The liquid precursor wetted the silica to form a stiff but stirrable solid. The pore volume loading of the silica was 125%. After five minutes of stirring with a spatula, the solid was dried as described in Example 1. After drying 5.06 g of free flowing solid was obtained. Analysis showed a loading of 8.92 wt % Al and 0.15 wt % Zr with an Al/Zr molar ratio of 203.

Comparative Example 3

In an inert $N_2$ atmosphere 3.5 g of 30 wt % methylalumoxane solution in toluene was added to 0.05 g dimethylsilanediylbis(2,2-dimethyl-indenyl)ZrCl$_2$ (metallocene B) followed by 4.0 g toluene to form the precursor. The metallocene dissolved immediately upon addition of the methylalumoxane. Separately, 4.0 g MS948 silica previously dehydrated to 600° C. in a stream of flowing $N_2$ was added to a beaker. After stirring for 5 minutes, the precursor was added all at once to the silica. The liquid precursor wetted the silica to form a stiff but stirrable solid. The pore volume loading of the silica was 125%. After five minutes of stirring with a spatula, the solid was dried as described in Example 1 After drying 5.0 g of free flowing solid was obtained. Analysis showed a loading of 8.8 wt % Al and 0.19 wt % Zr with an Al/Zr molar ratio of 158.

Example 4

In an inert $N_2$ atmosphere 0.0529 g of dimethylsilanediylbis(4,5,6,7-tetrahydroindenyl)ZrCl$_2$ (metallocene A) was dissolved in 14.6 g toluene. Separately 8.01 g MS948 silica previously dehydrated to 600° C. in a stream of flowing $N_2$ was added to a beaker. After stirring for 5 minutes, the metallocene solution was added all at once to the silica. The liquid wetted the silica to form a stiff but stirrable solid. The pore volume loading of the silica was 130%. After five minutes of stirring with a spatula, the solid was dried as in Example 1. At the end 10.1 g of free flowing solid was obtained. All of the solid was transferred to a beaker. Separately, 36.12 g of 30 wt % methylalumoxane solution in toluene was added to 0.070 g of dimethylsilanediylbis(2,2-dimethyl-indenyl)zirconium dichloride (metallocene B) followed by 6.0 g toluene to form the precursor. The metallocene dissolved immediately upon addition of the MAO. After stirring for 5 minutes, the precursor was added all at once to the solid obtained above. The liquid precursor wetted the silica to form a stiff but stirrable solid. The pore volume loading of the silica was about 160%. After five minutes of stirring with a spatula, the solid was dried as in Example 1. After drying, 10.23 g of free flowing solid was obtained. Analysis showed a loading of 9.03 wt % Al and 0.24 wt % Zr with an Al/Zr molar ratio of 128.

Comparative Example 5

In an inert $N_2$ atmosphere 5.154 g of 30 wt % methylalumoxane solution in toluene was added to 0.0248 g dimethylsilanediylbis(2,2-dimethyl-indenyl)ZrCl$_2$ (metallocene B) and 0.0224 g of dimethylsilanediylbis(4,5,6,7-tetrahydroindenyl)ZrCl$_2$ (metallocene A) followed by 2.28 g toluene to form the precursor. The metallocene dissolved immediately upon addition of the methylalumoxane. Separately, 4.0 g MS948 silica previously dehydrated to 600° C. in a stream of flowing $N_2$ was added to a beaker. After stirring for 5 minutes, the precursor was added all at once to the silica. The liquid precursor wetted the silica to form a stiff but stirrable solid. The pore volume loading of the silica was 126%. After five minutes of stirring with a spatula, the solid was dried as described in Example 1. After drying 5.412 g of free flowing solid was obtained. Analysis showed a loading of 11.7 wt % Al and 0.19 wt % Zr with an Al/Zr molar ratio of 210.

Example 6

In an inert $N_2$ atmosphere 2.054 g of 30 wt % methylalumoxane solution in toluene was added to 0.0518 g of dimethylsilanediylbis(4,5,6,7-tetrahydroindenyl)ZrCl$_2$ (metallocene A) followed by 12.14 g toluene. Separately 8.015 g MS948 silica previously dehydrated to 600° C. in a stream of flowing $N_2$ was added to a beaker. After stirring for 5 minutes, the metallocene solution was added all at once to the silica. The liquid wetted the silica to form a stiff but stirrable solid. The pore volume loading of the silica was 125%. After five minutes of stirring with a spatula, the solid was dried as in Example 1. All of the solid was transferred to a beaker. Separately, 5.517 g of 30 wt % methylalumoxane solution in toluene was added to 0.068 g of dimethylsilanediylbis(2,2-dimethylindenyl)zirconium dichloride (metallocene B) followed by 6.18 g toluene to form the precursor. The metallocene dissolved immediately upon addition of the MAO. After stirring for 5 minutes, the precursor was added all at once to the solid obtained above. The liquid precursor wetted the silica to form a stiff but stirrable solid. The pore volume loading of the silica was about 125%. After five minutes of stirring with a spatula, the solid was dried as in Example 1. After drying, 10.57 g of free flowing solid was obtained. Analysis showed a loading of 8.61 wt % Al and 0.19 wt % Zr with an Al/Zr molar ratio of 154.

Catalyst Polymerization Evaluation

A 2 liter autoclave reactor previously flushed with $N_2$ and containing triethylaluminum (0.25 ml of a 1M solution in hexane) and 1000 ml of propylene was heated to a temperature of 70° C. A 75 mg sample of the free flowing solid prepared above was slurried in 2 ml of hexane and charged with 250 ml of propylene to start the reaction. After one hour, the reactor was cooled, vented, purged with $N_2$ for 20 minutes and then opened. The polypropylene was transferred to a ceramic dish and allowed to dry in a fume hood overnight. The next day, the polymer was further dried in vacuo at 75° C. for one hour. The final dried polymer was weighed.

Polymerization Results

Table I summarizes catalyst testing under polymerization conditions described above. See the particular catalyst examples for preparation detail. The Comparative Example 2 catalyst having metallocene A+MAO on silica fouled the reactor and produced large hard clumps of polymer granules. The fouling and poor morphology were caused by the partial softening and/or partial solubility of the polymer in propylene liquid at the reactor temperature. The result was due to the less than adequate tacticity of the polypropylene formed.

The Comparative Example 3 catalyst having metallocene B+MAO on silica showed high activity and produced free flowing polymer granules which did not foul the reactor. The absence of fouling and good polymer morphology are due to the highly isotactic polypropylene formed.

The Example 1 catalyst prepared by contacting the 200° C. dehydrated silica with metallocene A then drying and contacting with metallocene B+MAO showed good activity and produced free flowing polymer granules which did not foul the reactor. The small average particle size of the polymer granules indicates the absence of agglomerated particles. A longer run showed that the high activity was sustained over an extended period with no deterioration in particle size, morphology or reactor cleanliness.

The Example 4 catalyst is similar to Example 1 except that 600° C. silica was used for the metallocene A contacting. Good activity, good morphology, and an absence of reactor fouling were observed.

The Example 6 catalyst was prepared by contacting the silica with metallocene A and part of the MAO followed by drying and contacting with metallocene B and the remainder of the MAO. The catalyst showed high activity and no reactor fouling but the average particle size of the polymer was higher due to agglomeration of some of the polymer granules.

The comparative Example 5 catalyst was prepared by contacting the silica with a toluene solution containing all of metallocene A, metallocene B and the MAO. The catalyst showed high activity and no reactor fouling but the average particle size of the polymer was higher due to agglomeration of some of the polymer granules. This result showed that agglomeration was not controlled by diluting metallocene A polymer with metallocene B polymer.

The polymerization results of 1 and 4 show that when the lower tacticity polymer producing metallocene A is anchored to the silica, reactor fouling and/or polymer agglomeration is controlled. This capability depends on the amount of interaction between metallocene A and the silica surface.

Polymer Property Results

Polymer property data are shown in Table II. The lower and higher melting points of the comparative Example 2 and 3 polymers are the direct result of the difference in polymer tacticities (lower for metallocene A and higher for metallocene B). Similarly, the broader and narrower melting ranges are the result of differences in tacticity and molecular weight (as indicated by the MFRs). The polymers are further characterized by temperature rising elution fractionation chromatography. CDBI is a measure of the polymer composition distribution, the higher the number, the more the polymer chains resemble one another. Percent solubles is a measure of two polymer properties. As the amount of low molecular weight material and low tacticity molecules increases so does the percent solubles. Polymer from metallocene A has the broader composition distribution and higher percent solubles.

The broad tacticity distributions for the mixed metallocene polymers are apparent from their broad melting ranges and multiple melting points. Composition distributions are broader than the metallocene B polymers as evidenced by the lower CDBI values. Percent solubles are lower than metallocene A polymers. Note that catalyst examples 1 and 4 produced lower solubles, broad tacticity, free flowing, non-agglomerated polymers.

TABLE I

| Catalyst Example | Preparation Steps[a] | Productivity[b] | Reactor Fouling | Polymer[c] APS ($\mu$) | Polymer Morphology |
|---|---|---|---|---|---|
| Comparative 2 | (A + MAO) | 630 | yes | — | large clumps |
| Comparative 3 | (B + MAO) | 3150 | no | 950 | free flowing granules |
| 1 | (A) + (B + MAO)[d] | 1040 | no | 801 | free flowing granules |
| 1 | (A) + (B + MAO)[d] | 2460[e] | no | 1006 | free flowing granules |
| 4 | (A) + (B + MAO) | 900 | no | — | free flowing granules |
| Comparative 5 | (A + B + MAO) | 990 | no | 1900 | portion as agglomerates |
| 6 | (A + MAO) + (B + MAO) | 1485 | no | 1985 | portion as agglomerates |

[a]A = dimethylsilanediylbis(4,5,6,7-tetrahydroindenyl)zirconium dichloride
B = dimethylsilanediylbis(2,2-dimethyl-indenyl)zirconium dichloride
C = methylalumoxane (MAO)
[b]Grams polymer per gram catalyst per hour for one hour polymerization unless otherwise noted.
[c]see experimental section
[d]on 200° C. silica
[e]2 hour polymerization run
Grams polymer per gram catalyst per hour for two hour polymerization

TABLE II

| Catalyst | | Melting | Melting Width at[b] | | TREF | |
|---|---|---|---|---|---|---|
| Example | MFR | Point[a] | ¼ Height | ½ Height | CDBI[c] | % Solubles[d] |
| Comparative 2 | >1000 | 134.6 | 10 | 22 | 81.4 | 9.6 |
| Comparative 3 | 25 | 147.5 | 10 | 4 | 91.3 | 2.4 |
| 1 | 19.7 | 134.0 146.6 | 21 | 7.7 | 88.0 | 3.5 |
| 4 | 19.1 | 135.0 148.8 | 19 | 7.3 | — | — |
| 5 | 24.0 | 132.2 144.3 | 22 | 9.6 | 80.8 | 5.4 |
| 6 | 39.8 | 132.2 145.8 | 23 | 11.5 | 76.3 | 5.3 |

[a]DSC second melt
[b]DSC second melt
[c]from temperature rising elution fractionation (TREF) calibrated versus $^{13}$CNMR.
[d]ibid (c)

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

Although the appendant claims have single appendencies in accordance with U.S. patent practice, each of the features in any of the appendant claims can be combined with each of the features of other appendant claims or the main claim.

We claim:

1. A method for preparing a supported metallocene catalyst, said method comprising the steps of:
   (a) combining support material and a first solution comprising a first metallocene thereby forming a mixture; then
   (b) removing the solvent from the mixture thereby forming a supported first metallocene; then
   (c) combining the supported first metallocene with a second solution comprising a second metallocene wherein the second metallocene is different from the first thereby forming a resultant mixture; then
   (d) removing the solvent from said resulting mixture.

2. The method of claim 1 wherein the support material is porous.

3. The method of claim 2 wherein the volume of the first solution is less than about 3 times the total pore volume of the porous support.

4. The method of claim 2 wherein the volume of the first solution is less than about 2 times the total pore volume of the porous support.

5. The method of claim 2 wherein the volume of the first solution is less than about 1.5 times the total pore volume of the porous support.

6. The method of claim 3 wherein the volume of the second solution is less than about 3 times the total pore volume of the porous support.

7. The method of claim 3 wherein the volume of the second solution is less than about 2 times the total pore volume of the porous support.

8. The method of claim 3 wherein the volume of the second solution is less than about 1.5 times the total pore volume of the porous support.

9. The method of claim 1 wherein the first solution comprises a metallocene and an activator.

10. The method of claim 9 wherein the activator is an alumoxane.

11. The method of claim 1 wherein the second solution comprises a metallocene and an activator.

12. The method of claim 11 wherein the activator is an alumoxane.

13. The method of claim 1 wherein the first metallocene is represented by the formula:

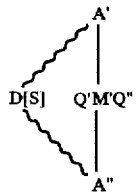

wherein M' is a Group 4, 5, or 6 transition metal; Q' and Q" are the same or different hydride, halogen, hydrocarbyl or alkyl radical having up to about 6 carbon atoms; A' and A" are the same or different asymmetrical substituted cyclopentadienyl or indenyl group; and D is a linear or cyclic hydrocarbon radical bridge of from one to six atoms.

14. The method of claim 1 wherein the second metallocene is represented by the formula:

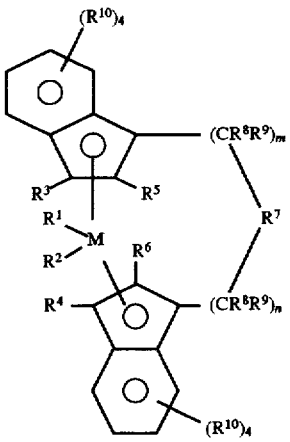

wherein M is selected from the group consisting of titanium, zirconium, hafnium, vanadium, niobium, tantalum, chromium, molybdenum and tungsten;

$R^1$ and $R^2$ are identical or different, and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, an —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

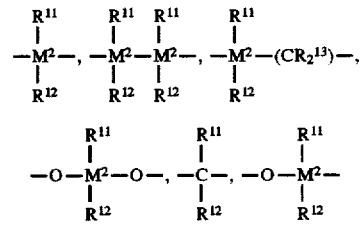

—$B(R^{11})$—, $^-Al(R^{11})$—, —Ge—, —Sn—, —O—, —S—, —SO—, —$SO_2$—, —$N(R^{11})$—, —CO—, —$P(R^{11})$—, or —$P(O)(R^{11})$—; wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ and two adjacent $R^{10}$ radicals can be joined together to form a ring system.

15. A method for preparing a supported metallocene catalyst, said method comprising the steps of:

(a) combining porous support material and a first solution comprising solvent and a first metallocene wherein the volume of said first solution is less than about three times the total pore volume of the porous support thereby forming a mixture; then (b) removing the solvent from the mixture thereby forming a supported first metallocene; then (c) combining the supported first metallocene with a second solution comprising solvent and a second metallocene wherein the second metallocene is different from the first and wherein the volume of solution is less than about three times the total pore volume of the supported first metallocene forming a resulting mixture; then (d) removing the solvent from said resulting mixture.

16. The method of claim 15 wherein the volume of first solution is less than about two times the total pore volume of the porous support.

17. The method of claim 15 wherein the volume of second solution is less than about two times the total pore volume of the porous support.

18. The method of claim 15 wherein the first solution comprises a solvent, a metallocene and an activator.

19. The method of claim 18 wherein the activator is an alumoxane.

20. The method of claim 15 wherein the second solution comprises a solvent, a metallocene and an activator.

21. The method of claim 20 wherein the activator is an alumoxane.

22. The method of claim 15 wherein the first metallocene is represented by the formula:

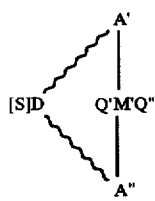

wherein M' is a Group 4, 5, or 6 transition metal; Q' and Q" are the same or different hydride, halogen, hydrocarbyl or alkyl radical having up to about 6 carbon atoms; A' and A" are the same or different asymmetrical substituted cyclopentadienyl or indenyl group; and D is a linear or cyclic hydrocarbon radical bridge of from one to six atoms;

and wherein the second metallocene is represented by the formula:

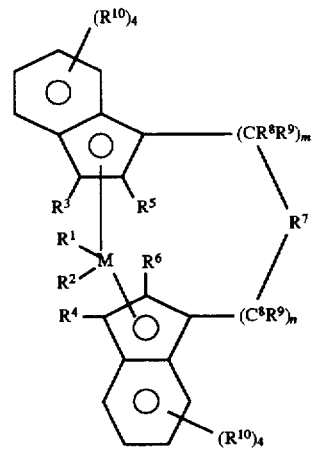

wherein M is selected from the group consisting of titanium, zirconium, hafnium, vanadium, niobium, tantalum, chromium, molybdenum and tungsten;

$R^1$ and $R^2$ are identical or different, and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, an —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

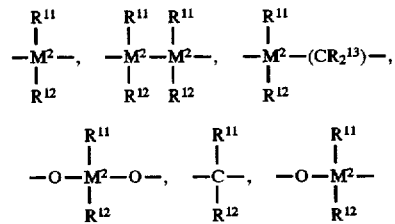

—B($R^{11}$)—, —Al($R^{11}$)—, —Ge—, —Sn—, —O—, —S—, —SO—, —SO$_2$—, —N($R^{11}$)—, —CO—, —P($R^{11}$)—, or —P(O)($R^{11}$)—; wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ and two adjacent $R^{10}$ radicals can be joined together to form a ring system.

23. A method for preparing a supported metallocene catalyst, said method comprising the steps of;
  (a) combining porous support material having active surface hydroxyl groups and a first solution consisting essentially of solvent and a first metallocene wherein the volume of said first solution is less than about 2.5 times the total pore volume of the porous support thereby forming a mixture; then
  (b) removing the solvent from the mixture thereby forming a supported first metallocene; then
  (c) combining the supported first metallocene with a second solution comprising solvent, a second metallocene, and an alumoxane wherein the second metallocene is different from the first and wherein the volume of solution is less than about 2.5 times the total pore volume of the supported first metallocene thereby forming a resulting mixture; then
  (d) removing the solvent from said resulting mixture.

24. The method of claim 23 wherein the second metallocene is represented by the formula:

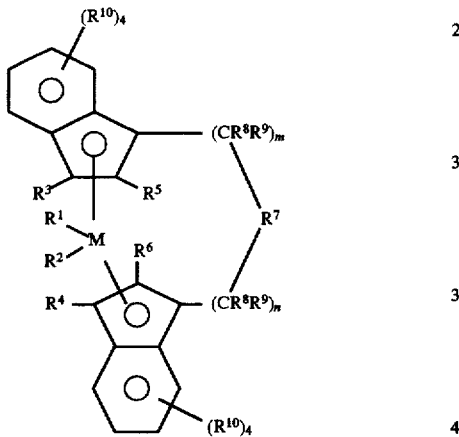

wherein M is selected from the group consisting of titanium, zirconium, hafnium, vanadium, niobium, tantalum, chromium, molybdenum and tungsten;

$R^1$ and $R^2$ are identical or different, and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, an —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

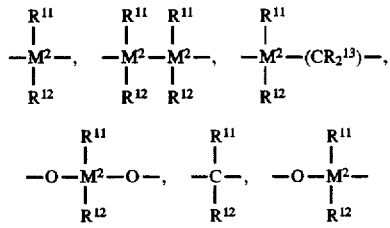

—$B(R^{11})$—, $^-Al(R^{11})$—, —Ge—, —Sn—, —O—, —S—, —SO—, —$SO_2$—, —$N(R^{11})$—, —CO—, —$P(R^{11})$—, or —$P(O)(R^{11})$—; wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ and two adjacent $R^{10}$ radicals can be joined together to form a ring system.

25. The method of claim 24 wherein the first metallocene is represented by the formula:

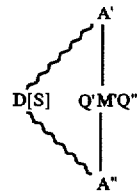

wherein M' is a Group 4, 5, or 6 transition metal; Q' and Q" are the same or different hydride, halogen, hydrocarbyl or alkyl radical having up to about 6 carbon atoms; A' and A" are the same or different asymmetrical substituted cyclopentadienyl or indenyl group; and D is a linear or cyclic hydrocarbon radical bridge of from one to six atoms.

* * * * *